United States Patent [19]

Torii et al.

[11] 4,363,984

[45] Dec. 14, 1982

[54] DIGITALLY CONTROLLED BRUSHLESS MOTOR

[75] Inventors: Michihiro Torii, Hamamatsu; Masanao Okuda, Kosai; Yuzuru Suzuki, Shizuoka, all of Japan

[73] Assignee: Fuji Electrochemical Co., Ltd., Tokyo, Japan

[21] Appl. No.: 198,235

[22] Filed: Oct. 17, 1980

[30] Foreign Application Priority Data

Oct. 18, 1979 [JP] Japan ............................ 54-134637

[51] Int. Cl.³ .......................................... H02K 21/12
[52] U.S. Cl. ................................... 310/156; 310/74; 310/90; 310/153; 310/162
[58] Field of Search ............... 310/156, 49, 51, 257, 310/46, 90, 74, 153, 162–164

[56] References Cited

U.S. PATENT DOCUMENTS

| | | | |
|---|---|---|---|
| 3,197,659 | 7/1965 | Marshall | 310/49 R |
| 3,199,009 | 8/1965 | Lien | 310/49 R |
| 3,201,671 | 8/1965 | Schiebeler | 310/49 R |
| 3,508,091 | 4/1970 | Kavanaugh | 310/156 |
| 3,549,918 | 12/1970 | Croymans | 310/162 |
| 3,633,055 | 4/1972 | Maier | 310/162 |
| 3,904,902 | 9/1975 | Inariba | 310/162 |
| 4,052,630 | 10/1977 | Inariba | 310/162 |

*Primary Examiner*—R. Skudy
*Attorney, Agent, or Firm*—Fleit & Jacobson

[57] ABSTRACT

A brushless motor actuated by a predetermined frequency and driven at constant speed with less wow and flutter component in accordance with a pulse signal of the frequency applied. The motor has a rotor enclosed in a stator, the latter having driving windings. The rotor includes a rotor shaft and a flywheel connected to the shaft. The flywheel is housed in a motor case.

8 Claims, 7 Drawing Figures

DIGITALLY CONTROLLED BRUSHLESS MOTOR

BACKGROUND OF THE INVENTION

The present invention relates to a digital controlled, or pulse controlled, constant speed brushless motor actuated by a predetermined frequency and rotated continuously in accordance with the frequency with less speed irregularity, and more particularly to the motor of the type described which is used particularly for, though not limited to, direct-driving a capstan of a tape recorder, chart feed machanism for direct-writing recorders, drum drive mechanism for facsimiles, and disc rotation mechanism for floppy disc drives.

One of the typical motors of the type described is a so-called DC motor, which can be manufactured to be relatively small in size and therefore less power consumption is required. The DC motor, however, is not suitable for slow speed rotation requirement and has disadvantages that a certain controlling device is additionally required since it does not have a characteristic of constant rotational speed. In other words, the DC motor, if it should be operated at a constant speed, needs a sensor or detector of the rotational speed so as first to detect the speed difference from the predetermined speed and then to add a suitable torque which is proportional to the speed difference. Otherwise, the DC motor should be provided with another feed-back mechanism similar to the detector described. In addition to the above, in case that the DC motor is of brushless type, a rotational position sensor such as Hall element is required. Thus, the DC motor requires some special circuit devices for detecting the rotational position and the speed of the rotor thereof, the special circuit devices being generally complex and expensive, and moreover quite difficult to locate the elements in accurate position. In addition to the above disadvantage, the DC motor has another disadvantage that a very complex operating windings should be provided in the axial direction on multi-layered or laminated silicon steel plates which have numerous slots, resulting in an excessive height or axial length of the motor. Further, the height of the motor becomes greater if the aforementioned sensor or detector is provided.

A stepper motor is well known to have a step-angle advancement for use in a numerical control system. The stepper motor is synonymous with a pulse motor or a stepping motor, in which an electromagnetic force is generated for driving the rotor in certain definite angular movement when pulse signals are transmitted to a stator winding. In the stepper motor, therefore, rotational frequency of the rotor is proportional to the pulse frequency if the latter is given continuously. It is also known, however, that the stepper motor is not advantageously used as a motor for a smooth rotation as is required in the direct-driving mechanism for a capstan of a tape recorder since it produces rotational irregularity due to the step-angle advancement.

SUMMARY OF THE INVENTION

A principal object of the present invention is to provide a new type of motor which is free of the aforementioned disadvantages of the DC motor and of stepper motor.

Another object of the present invention is to provide a new motor of the type described, which permits a constant rotational speed with less wow and flutter.

Another object of the present invention is to provide a new motor of the type described, which is smaller in size and can be formed thinner.

Additional object of the present invention is to provide a new motor of the type described, which can be readily dismantled for inspection or repairment of the inner parts of the motor.

A motor according to the present invention is constructed based upon the advantage of constant rotational frequency of the stepper motor which is driven by the pulse train of a constant frequency, but the disadvantage of irregular rotation, namely smoothlessness, which is inherent to the stepper motor is absorbed by means of a suitably installed flywheel. The flywheel, however, is not merely attached to an end of a rotor shaft such that the flywheel is disposed outside the motor casing. The structure as described provides a disadvantage that a completed or assembled motor structure cannot be dismantled easily when, for example, some defects are found in motor elements during an inspection procedure. In other words, it will be impossible to dismantle the motor elements without detaching the flywheel which, however, is rigidly fixed to the rotor shaft. The forcible detaching of the flywheel results in impossibility of re-use of the flywheel and the rotor shaft. Additionally, in the construction described above, the flywheel is merely supported at the end of rotor shaft, and this is rather unstable support since undesired force is added to a bearing of the shaft and looseness is produced. Furthermore, it will be impossible to proceed with adjustment of static and dynamic balances after the rotor is assembled, the adjustment being prerequisite to this type of a motor with flywheel. Besides, the structure described above in which the flywheel is attached outside the motor cover results in an excessive dimensional increase since greater axial dimension is required so as not to objectionably contact adjacent elements and parts of the motor. This will be quite a difficult problem particulaly when the motor is used for a capstan driving of a tape recorder which requires definite and minimum thickness. The present invention provides a new motor which does not have such disadvantages as those described above.

Briefly, the motor according to the present invention comprises a rotor enclosed in a stator, the rotor including a rotor shaft and a flywheel connected to the rotor shaft. The flywheel is housed in a motor case. The motor case and a flange which is connected with the motor case may be made of magnetic materials so as to shield the magnetic influence from windings of the stator.

Other objects and features of the present invention will become apparent from the detailed description of preferred embodiments thereof, which will made with reference to the accompanying drawings. It is to be understood that drawings and accompanying description are for the purpose of illustration only and do not limit the invention.

DETAILED DESCRIPTION OF THE INVENTION

Figure 1:
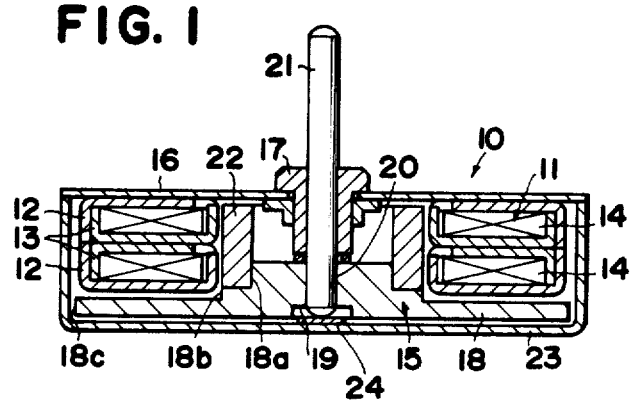
FIG. 1 is a sectional view of a motor embodying the present invention.

In the drawings, like parts are designated by the same numerals through the various figures.

Figure 2:
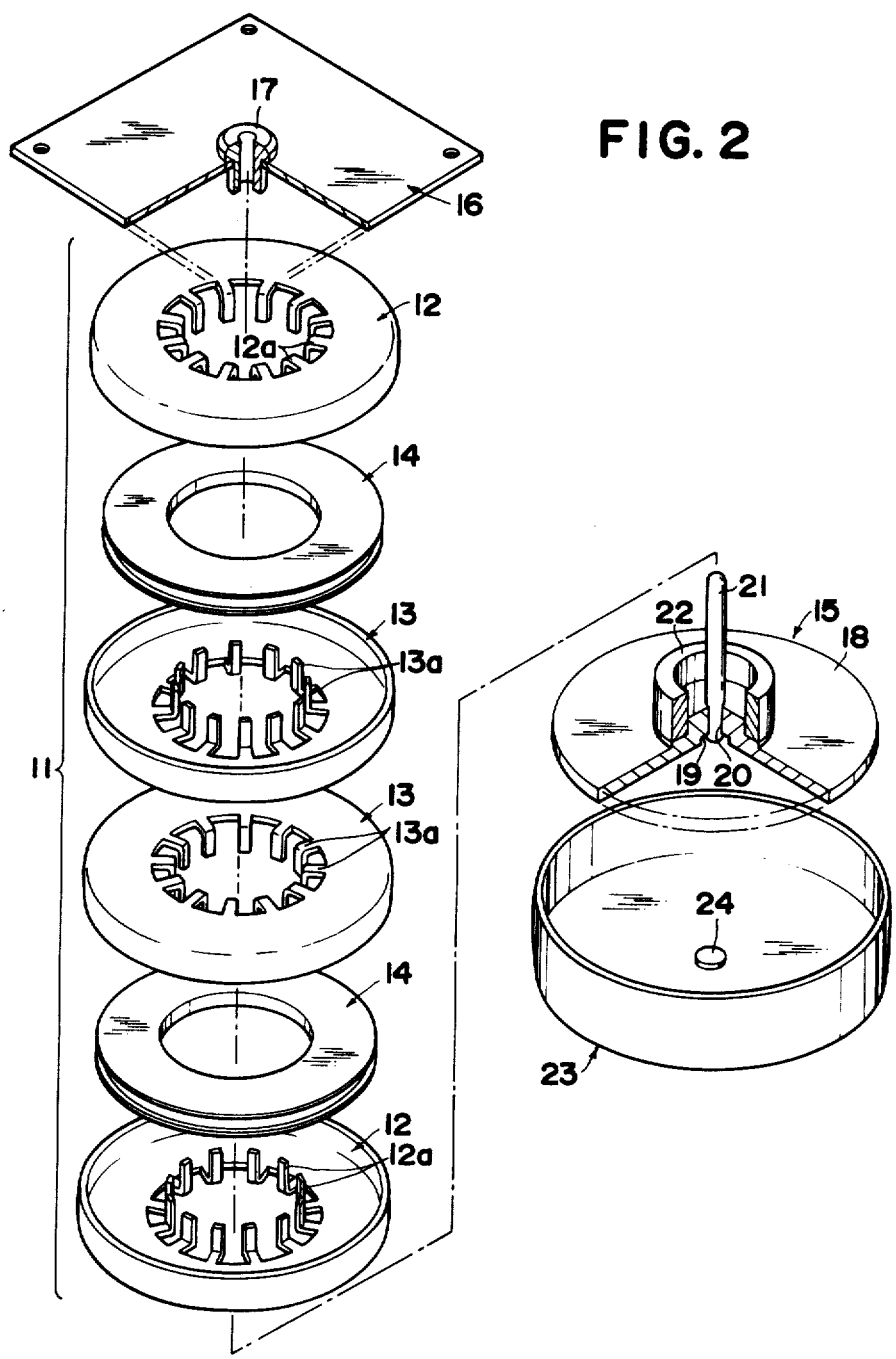
FIG. 2 is a partly fragmented perspective view of the motor shown in FIG. 1, the parts being taken apart.

Referring first to FIGS. 1 and 2, motor which is indicated in its entirety at 10 has a stator part generally indicated by numeral 11 and a rotor part generally indicated by numeral 15. The stator part 11 has a structure similar with that of a known stepper motor which has a permanent magnet rotor, and is provided with outer yokes generally indicated at 12, inner yokes 13 and windings 14 interposed between the outer and inner yokes. In the illustrated embodiment, two pairs of those elements are shown. The outer yokes 12 have a plurality of polar teeth 12a extending towards their axes at constant interval from an inner circumference of the yokes. Similarly, the inner yokes 13 have a plurality of polar teeth 13a. The winding 14 is disposed between the outer yoke and inner yoke of each pair. The outer yoke 12 and inner yoke 13 containing therebetween the winding 14 are connected together such that the teeth 12a of the outer yoke 12 are staggered relative to the teeth 13a of the inner yoke 13. The inner yokes 13 are in an opposed relation with each other, and the teeth of one inner yoke are staggered or skewed by one fourth ($\frac{1}{4}$) of the angular degree of the teeth of the other inner yoke. The two pairs of the thus formed yoke structure are attached to a flange 16, the latter having a bearing 17 at the center thereof. The structure of the stator part 11 is similar to that of the known stepper motor, and any further detailed description will not be made.

The rotor part 15 is provided with a flywheel or an inertial ring 18 in an integral fashion, in which the flywheel is of disc shape and has, in turn, upper portion 18a, middle portion 18b having a diameter larger than that of the upper portion 18a, and lower portion 18c having a diameter larger than that of the middle portion 18b. The flywheel 18 has a recess 19 at the central bottom thereof and a central hole 20 communicated to the recess 19. A rotor shaft 21 is press-fitted into the hole 20 of the flywheel 18, in which the end of the rotor shaft 22 extends to a horizontal plane of the bottom of the flywheel. At the middle portion 18b of the flywheel 18 is rigidly provided an annular permanent magnet 22 such as ferrite magnet which has an outer diameter substantially equal to the diameter of the middle portion 18b. The annular permanent magnet 22 has multi-pole magnetization evenly spaced apart, the adjacent poles being of opposite direction, such that the number of poles of the rotor is equal to that of the stator. The flywheel 18 is designed to have a maximum outer diameter substantially equal to the outer diameter of the combined structure of the yokes 12 and 13. Namely, the outer end of the lower portion 18c of the flywheel 18 is substantially aligned, in a vertical relation, with an outer circumferential surface of the stator part 11.

The rotor part 15 as described is snuggly inserted into the stator part 11 such that the rotor shaft 21 is rotatably supported within the bearing 17, and thereafter a casing 23 is fixed to the flange 16. The rotor shaft 21 is also supported at its end by a bearing 24 provided at a center of a casing 23. Thus the permanent magnet 22 is positioned in a symmetrical relation relative to the stator 11 or a dividing plane between the two inner yoke 13.

In a case that the motor is applied for driving a magnetic tape of tape recorder in which a magnetic flux produced by the windings of the motor must be shielded so as not to adversely affect the magnetic head, it is desired that the flange 16 as well as the casing 23 be made of magnetic materials.

An operation of the motor illustrated in FIGS. 1 and 2 will be described. An electric current pulse of a constant frequency is applied to the windings 14 to drive the motor. If a load of the motor is less than a pull in torque of the motor at the applied frequency, the rotor part rotates in accurate proportion to the applied frequency. This means that the property of constant rotational speed of the motor according to the present invention is dependent primarily upon the stability of the applied frequency, and not upon the structure of the motor. Accordingly, absolutely accurate rotational speed can be realized by utilizing an oscillator provided with a crystal or quartz. Torque unevenness induced inherently by the spatial polar teeth 12a, 13a and peripheral speed irregularity due to the torque unevenness is substantially completely absorbed by the flywheel 18, with the result of a smooth and regular rotation.

As is generally known, the stepper motor can be multipolarized and the step angle can be minimized. Accordingly, a constant rotation at a lower frequency range can be achieved by utilizing the oscillator of stable frequency. According to the present invention, the motor will be driven under a completely balanced condition relative to the rotational direction, since the elements such as teeth of the yokes 12, 13 are symmetrical relative to a rotational direction of the rotor part 15 and all the teeth of at least a pair of the inner and outer yokes are energized at the same time under the same conditions. Therefore, the motor according to the present invention is free from an unbalanced driving as is the case of the known DC motor, and does not produce a wow component or a low frequency flutter.

A problem of an uneven rotation at a relatively high frequency range, namely, a flutter component, is substantially fully absorbed by a suitable inertia moment. That is, the flywheel 18 has a function to absorb the high frequency component and to produce a desired Wow and Flutter properties by a minimum size of flywheel. The inventors have found that a flywheel made of a die casting zinc alloy of a minimum size (for example, 43 mm of diameter, 1.5 mm of thickness) is satisfactorily applicable to a motor for a direct drive of a capstan for a tape recorder.

The motor according to the present invention is readily disassembled by merely disconnecting the flange 16 from the casing 23 when such disassembly is required. When disconnected, the rotor part 15 which consists of flywheel 18, rotor shaft 21 and permanent magnet 22 can be readily removed to proceed with a necessary inspection or repairment. If foreign matters or undesired things such as incorrect positioning of elements such as the polar teeth are found, these undesired matters and things can be removed or adjusted readily. Easy dismantling of the parts permits an inspection of various properties of the motor with the flywheel 18 being fixed to the rotor shaft 21. It will be understood from the foregoing that the motor in the present invention can be inspected or examined under the condition of an actual use without disengaging the flywheel from the rotary shaft, and that reliable inspection or examination can be achieved.

In an experiment, an inventive motor having characteristics of 48 mm $\phi$ of outer diameter, 18 mm of height and 48 pulses per rotation with a flywheel of 100–150 g. cm$^2$ was driven under the condition of 360 rpm, namely, pulse frequency of 288 pps. The experiment revealed that weighted root mean square value (WRMS) was less than 0.02% WRMS, which is critical to a test tape for a tape recorder.

Figure 3:
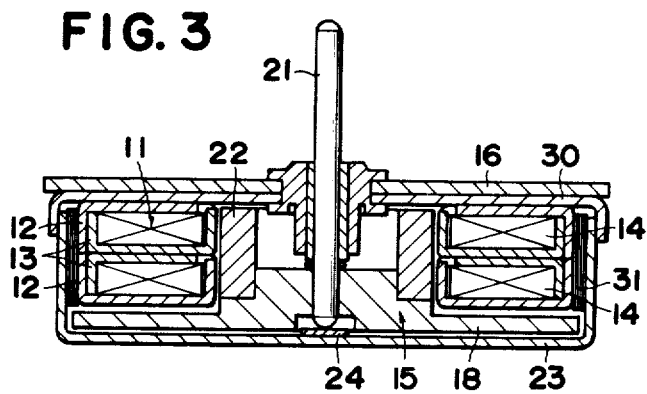
FIG. 3 is a sectional view of a motor according to another embodiment of the present invention.

FIG. 3 shows a second embodiment of the present invention. In this embodiment, an auxiliary cover 30 made of a high permeability material is disposed beneath the flange 16 for shielding a noise induced from the windings 14, and a ring 31 around the stator part 11 for shielding a magnetic flux leakage from the connection between the two outer yokes. The ring 31 is made of high permeability materials such as a wound or laminated silicone steel plate. This structure is desired particularly for a tape recorder in which a magnetic head is located adjacent the motor. The other parts and structure of the embodiment of FIG. 3 are substantially similar to those of FIGS. 1 and 2 and will be understood from the foregoing description and any further description will not be made.

Figure 4:
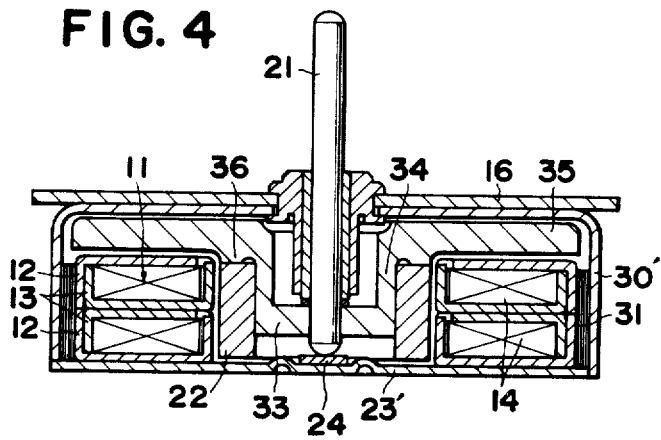
FIG. 4 is a sectional view of a motor according to a further embodiment of the present invention.

FIG. 4 shows a modification of the structure shown in FIG. 3. In this embodiment, the stator part 15 or the combined structure of the yokes 12 and 13 is positioned as far as possible from a magnetic head (not shown) which will be generally located above the flange 16, so as to shield the magnetic head from magnetic influence. In order to achieve the magnetic shield effect as described, the flywheel in this embodiment is designed to have a space for locating thereat the stator part 11. Namely, the flywheel 18 engaged with the lower end portion of a rotor shaft 21 has a central portion 33 extending outwardly, an upright portion 34 extending upwardly from the outer end of the central portion 33, an extension 35 projecting outwardly from a top end of the upright portion 34, and a shoulder 36 on an inner lower surface of the extension 35 for fixing thereto an annular permanent magnet 22 in combination with an outer circumferential surface of the upright portion 34. It will be readily understood that the central portion 33, shoulder 36 and extension 35 represent or correspond to, respectively, the upper portion 18a, middle portion 18b and lower portion 18c of the flywheel of the embodiment shown in FIGS. 1 and 2. The other parts and structure are substantially similar to those of FIG. 3, but a cover 23′ in this embodiment is in the form of a flat plate, while an auxilliary cover 30′ is of cup shape. Between the circumferential inner surface of the auxiliary cover 30′ and the outer circumferential surface of the yokes 12, 13 is provided an annular space for securing therein a ring 31 which functions to shield a magnetic flux leakage from the yokes which contain therein windings.

Figure 5:
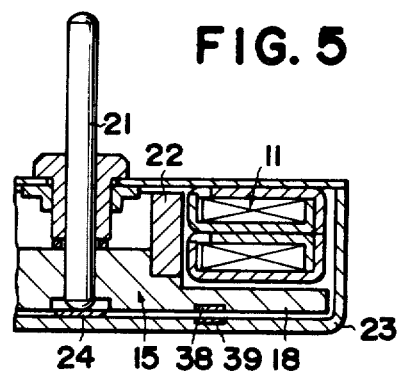
FIG. 5 is a sectional view of a modified structure according to the present invention.

FIG. 5 shows a modification of the previously mentioned embodiments of the invention, in which some parts are not shown for clarification. In this modified structure, substantially ring-shaped permanent magnets 38, 39 are disposed on the opposing surfaces of the flywheel 18 and the casing 23. The ring-shaped magnets are readily mounted to the elements 18 and 23 by simply forming a recess on a lower surface of the flywheel 18 and a recess on an upper surface of the casing 23, and fixing these magnets to the recesses by suitable means such as an adhesive agent. The opposing magnets 38, 39 have polarity such that adjacent poles are of opposite polarity. It will be understood from the foregoing that the ring-shaped magnets 38, 39 will attract each other and that provision of the magnets will be desired particularly when the motor is installed in a portable machine in which the rotary shaft 21 is not necessarily vertical to a horizontal plane, while the structure of the previous embodiments shown in FIGS. 1, 3 and 4 may sometimes provide an axial movement of the rotor part 15 since the shaft 21 is merely supported by the two bearings 17 and 24. Magnetic force of the ring shaped magnets 37, 38 will not affect at all the stable rotation of the rotor since the direction of the magnetic force is identical to the axial direction of the rotor.

Figure 6:
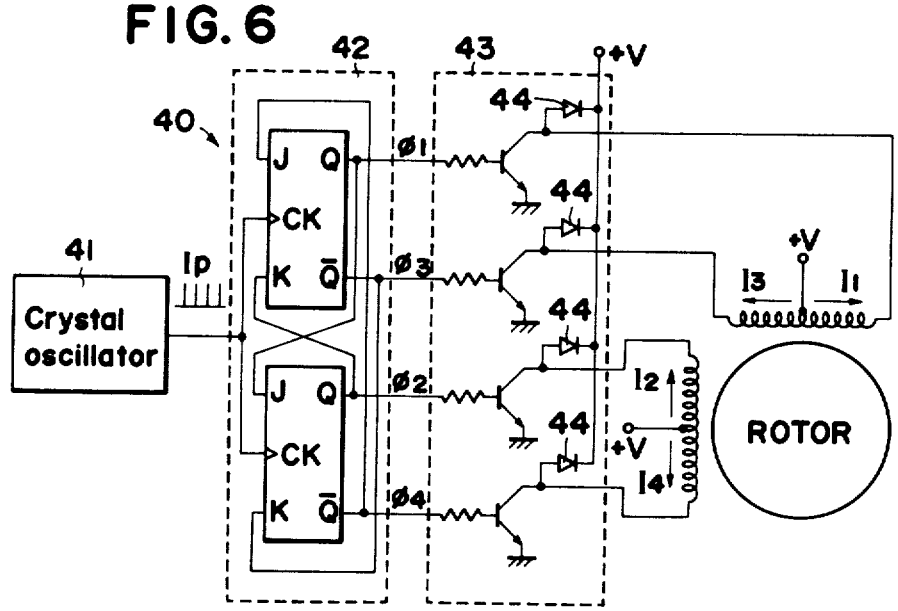
FIG. 6 is a diagram of an exemplified electical circuitry applicable to an operation of the inventive motor.
Figure 7:
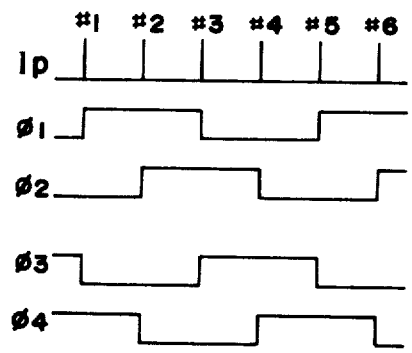
FIG. 7 is a timing chart of electrical pulses applied to a driving device of the electric circuitry shown in FIG. 6.

An operation of the motor will be described with reference to FIGS. 6 and 7. Generally, a known driving device for a known stepper motor can be utilized with some modification for driving the motor of the present invention, and FIG. 6 shows an exemplified driving circuitry. The illustrated device generally indicated at 40, shown for the purpose of simplification, is used for rotating the rotor of the motor in one direction only wherein the motor which has two annular coils with bifilar winding is energized in two-phase.

A pulse train Ip of a fixed frequency from a crystal oscillator 41 is fed to a distributor 42 to produce signals ($\phi_1,-,\phi_4$) for deciding the order of energization. The distributor 42 may be readily constructed by employing two J-K flip-flops, as illustrated. Timing of energization signals $\phi_1$ to $\phi_4$ is shown in FIG. 7. The energization signals are fed to the driving circuit 43 and actuate to switch on and off emitter-common NPN power transistors in accordance with the timing of the energization signals. The coils of bifilar winding have a common end connected to a positive power source whereas the other ends are connected to the corresponding collectors of the transistors, and electric current $I_1,-,I_4$ is fed to each of the windings of the coils in accordance with the on-off switching of the transistors, to thereby rotate the rotor. The diodes generally illustrated at 44 are referred to as flyback diodes or free-wheeling diodes and function to decrease a spike voltage induced when the transistors are switched off. Namely, according to the present invention, a smooth rotation of the rotor at a constant speed can be realized in accordance with the pulse train of the predetermined frequency.

It will be understood that the motor is of any one of types of 2-phase driving mode, 1-phase driving mode and 1-2-phase driving mode, and that the coils may be of monofilar winding.

According to the motor of the present invention, the shaft has a flywheel, that is, a load, which means that a starting pulse rate of the motor will be lowered by the load. When an input pulse frequency corresponding to a desired speed of the rotor is higher than the starting pulse rate, pulse trains lower than the starting pulse rate are supplied at an initial stage and followed by progressively increased frequency until it reaches the predetermined frequency.

As will be understood from the detailed description of the invention, the inventive motor provides a smooth rotation and stable constant speed of rotation in an open-loop without providing a complex circuitry such as a sensor or detector for speed control and/or close-loop controlling circuits for feeding back signals from the sensor. Further, the inventive motor can be readily dismantled for the purpose of inspection and so forth after the same is assembled. Besides, all of the aforementioned objects of the present invention can be accomplished.

Though the present invention has been described with reference to the preferred embodiments, many modifications and alterations can be made within the spirit of the invention.

What is claimed is:

1. A pulse-controlled brushless motor of constant speed, comprising:

a rotor rigidly mounted on a rotary shaft, said rotor having an integral inertia ring, a stator having driving windings and inner and outer yokes, said yokes each having a plurality of polar teeth projecting inwardly at a constant interval, said windings being mounted within said inner and outer yokes, first means for rotatably supporting at least one of said rotor and said stator, said first means having a casing and a bearing at the center of said casing, to thereby rotatably support an end of said rotary shaft, second means for rotatably supporting the other one of said rotor and said stator, said second means having a bearing for rotatably securing said shaft, and a cover member fixed to said bearing of the second means, said cover member and said casing shielding a magnetic flux of said yokes, and an annular magnet concentric with said rotary shaft and fixed to said rotor, said magnet being permanently magnetized in a multi-pole fashion to have a plurality of north and south poles alternately arranged along its circumference, whereby said rotor is rotated smoothly and constantly when electric pulses of a predetermined frequency are supplied to said driving windings.

2. The motor according to claim 1, wherein at least one of said casing and said cover member is made of a material of high magnetic permeability.

3. A pulse-controlled brushless motor of constant speed comprising:

a rotor mounted on a rotary shaft, said rotor having an integral inertia ring, a stator having driving windings and inner and outer yokes, said yokes each having a plurality of polar teeth projecting inwardly at a constant interval, said windings being mounted within said inner and outer yokes, an annular magnet concentric with said rotary shaft and fixed to said rotor, said magnet being permanently magnetized in a multi-pole fashion to have a plurality of north and south poles alternately arranged along its circumference, and a casing and a cover member for containing therein the rotor, the stator and the annular magnet, wherein said integral inertia ring has a permanent magnet at a surface opposing said casing, said casing having a permanent magnet at a surface opposing said integral inertia ring, said permanent magnet of the integral inertia ring attracting said permanent magnet of the casing, whereby said rotor is rotated smoothly and constantly when electric pulses of a predetermined frequency are supplied to said driving windings.

4. The motor according to claim 3, wherein said permanent magnet of the inertia ring is located in alignment with said permanent magnet of the casing, the both permanent magnets being of ring shape.

5. The motor according to any one of claims 1 or 3, wherein said rotor integral with said inertia ring has a port for fixedly securing said annular magnet.

6. The motor according to any one of claims 1 or 3, further comprising a ring on an outer circumferential surface of said stator, said ring being made of material of high magnetic permeability to thereby shield a magnetic flux of said windings.

7. The motor according to any one of claims 1 or 3, wherein said annular magnet is symmetrical relative to said inner and outer yokes.

8. The motor according to any one of claims 1 or 6, wherein said stator comprises at least two pairs of inner yokes and outer yokes, and wherein two inner yokes are connected in an opposing relation, said annular magnet being symmetrical to a dividing surface of said two inner yokes.

* * * * *